No. 672,994.  
L. WACKER.  
APPARATUS FOR PRESERVING FOODS.  
(Application filed Dec. 31, 1897.)  
Patented Apr. 30, 1901.
(No Model.)
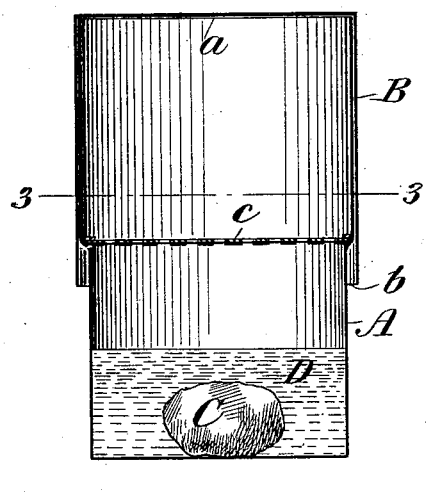
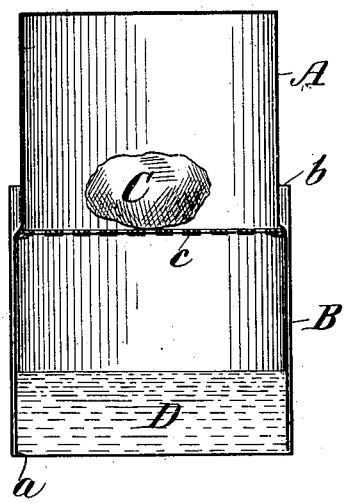
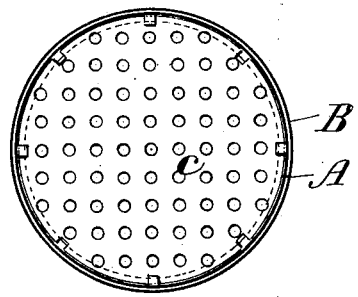
WITNESSES:
INVENTOR  
Leonhard Wacker  
BY his  
Witter Kenyon  
ATTORNEYS

UNITED STATES PATENT OFFICE.

LEONHARD WACKER, OF MUNICH, GERMANY.

APPARATUS FOR PRESERVING FOODS.

SPECIFICATION forming part of Letters Patent No. 672,994, dated April 30, 1901.

Application filed December 31, 1897. Serial No. 664,893. (No model.)

*To all whom it may concern:*

Be it known that I, LEONHARD WACKER, a subject of the Emperor of Germany, residing in Munich, Germany, have invented an Apparatus for Preserving, of which the following is a specification.

This invention relates to an apparatus for preserving meat, fish, poultry, or other kinds of food or substances requiring sterilized surroundings for their proper preservation.

The invention consists of the apparatus hereinafter set forth, and covered in the claims.

In the drawings showing one embodiment of the invention, and in which like letters of reference designate corresponding parts, Figure 1 is a vertical section of the apparatus in one position. Fig. 2 is a vertical section of the apparatus inverted, and Fig. 3 is a horizontal section on the line 3 3 of Fig. 1.

A and B designate two telescoping sections of a receptacle which may be round in shape, as shown, or of any other convenient shape and size. The inner section A comprises air-tight walls and bottom and is open at the end $a$, and the outer section B comprises air-tight walls and bottom and is open at the end $b$. The opposite or outer ends of the two sections A and B have air and liquid tight closed ends $a'$ and $b'$, respectively. These sections may be secured together by any suitable means.

$c$ is an open shelf or partition removably secured across the inner section.

C designates any substance which it is desired to preserve—as, for example, a piece of meat.

D is the preserving antiseptic liquid, which I generally form of a suitable mixture of water, salt, and vinegar.

In using the apparatus the liquid in sufficient quantity is poured into the inner section, being entirely retained by the walls and closed end of the same. The shelf $c$ and section B are adjusted and the liquid is boiled, so that its vapor fills the space above the liquid, escaping through the passage between the two sections A and B. The steam or vapor thus sterilizes the interior of the apparatus and the shelf $c$. The shelf is now taken out, the meat C is put into the liquid, and the shelf and section B are replaced. After the meat has remained in the liquid ten or fifteen minutes, during which time the liquid is generally well shaken, the apparatus is inverted, being thus brought into the position shown in Fig. 2. The liquid of course flows past the partition or shelf and rests upon the closed end of the section B, which now forms the bottom of the apparatus, and this liquid forms a seal at the bottom where the sections meet. This seal of course keeps the interior of the apparatus in its antiseptic condition. The meat C, it will be seen, now rests upon the shelf $c$ above the liquid.

While I prefer to employ a shelf to support the substance in preservation above the liquid, as shown in Fig. 2, it will of course be seen that I may employ other means for this purpose. Again, other preserving liquids may of course be used besides the one above specified without departing from my invention. If the liquid employed vaporizes at a sufficiently low temperature to sterilize the interior, it need not then of course be boiled.

The apparatus may be made of any suitable material. Glass, enameled sheet-iron, or porcelain will be found quite satisfactory, and in its best form the sections A and B are each made in one permanent whole.

What I claim as new, and desire to secure by Letters Patent, is—

1. An invertible antiseptic preserving-receptacle designed to contain an antiseptic preserving liquid, and consisting of two telescoping sections, each having its walls and outer end connected by joints that are air and liquid tight, whereby when the receptacle is in one position, the preserving liquid will rest on the closed end of the inner section, and be entirely retained within said end and adjacent walls, and when the receptacle is inverted the liquid will rest upon the closed end of the outer section, and form a liquid seal to prevent the ingress of outer air, substantially as set forth.

2. An invertible antiseptic preserving-receptacle designed to contain an antiseptic preserving liquid, and consisting of two telescoping sections, each having its walls and outer end connected by joints that are air and liquid tight, whereby when the receptacle is in one position, the preserving liquid will rest on the closed end of the inner section, and be entirely retained within said end and adjacent walls, and when the receptacle is inverted the liquid will rest upon the closed end of the outer section, and form a liquid seal to prevent the ingress of outer air, the receptacle having means to support the contents to be preserved above the level of the liquid when the receptacle is inverted, substantially as set forth.

3. An invertible antiseptic preserving-receptacle designed to contain an antiseptic preserving liquid, and consisting of two telescoping sections, each having its walls and outer end connected by joints that are air and liquid tight, whereby when the receptacle is in one position, the preserving liquid will rest on the closed end of the inner section, and be entirely retained within said end and adjacent walls, and when the receptacle is inverted the liquid will rest upon the closed end of the outer section, and form a liquid seal to prevent the ingress of outer air, the receptacle having an open shelf or partition to support the contents to be preserved above the level of the liquid when the receptacle is inverted, substantially as set forth.

In testimony whereof I have signed my name to this specification in the presence of two subscribing witnesses.

LEONHARD WACKER.

Witnesses:
EUGEN TANOLI,
JOSEPH POPP.